US010689265B2

(12) United States Patent
Mahna

(10) Patent No.: US 10,689,265 B2
(45) Date of Patent: Jun. 23, 2020

(54) WATER DESALINIZATION SYSTEMS

(71) Applicant: Satish Mahna, Beachwood, OH (US)

(72) Inventor: Satish Mahna, Beachwood, OH (US)

(*) Notice: Subject to any disclaimer, the term of this patent is extended or adjusted under 35 U.S.C. 154(b) by 0 days.

(21) Appl. No.: 16/592,449

(22) Filed: Oct. 3, 2019

(65) Prior Publication Data
US 2020/0123023 A1 Apr. 23, 2020

Related U.S. Application Data

(60) Provisional application No. 62/746,856, filed on Oct. 17, 2018, provisional application No. 62/781,125, filed on Dec. 18, 2018.

(51) Int. Cl.
C02F 1/14 (2006.01)
B01D 1/00 (2006.01)
C02F 1/04 (2006.01)
C02F 103/08 (2006.01)

(52) U.S. Cl.
CPC .............. C02F 1/14 (2013.01); B01D 1/0035 (2013.01); C02F 1/043 (2013.01); C02F 2103/08 (2013.01); C02F 2303/10 (2013.01)

(58) Field of Classification Search
CPC ........... C02F 1/043; C02F 1/14; B01D 1/0035
See application file for complete search history.

(56) References Cited

U.S. PATENT DOCUMENTS

| 3,960,668 | A | | 6/1976 | Rush | |
|---|---|---|---|---|---|
| 4,194,949 | A | * | 3/1980 | Stark | B01D 3/00 202/180 |
| 4,308,111 | A | | 12/1981 | Pampel | |
| 4,323,052 | A | * | 4/1982 | Stark | C02F 1/14 126/571 |
| 4,749,447 | A | * | 6/1988 | Lew | C02F 1/046 202/177 |
| 6,057,504 | A | * | 5/2000 | Izumi | F03G 6/001 136/246 |
| 8,056,554 | B2 | * | 11/2011 | Hinderling | B63B 35/44 126/628 |
| 10,093,552 | B2 | * | 10/2018 | Lee | C02F 1/14 |
| 10,183,233 | B1 | * | 1/2019 | Haidar | B01D 1/0035 |
| 10,233,095 | B1 | * | 3/2019 | Haidar | C02F 1/14 |

(Continued)

FOREIGN PATENT DOCUMENTS

JP H09220031 8/1997

OTHER PUBLICATIONS

International Search Report, 3 pages, dated Dec. 27, 2019.
Written Opinion, 5 pages, dated Dec. 27, 2019.

Primary Examiner — Jonathan Miller
(74) Attorney, Agent, or Firm — Benesch, Friedlander, Coplan & Aronoff LLP

(57) ABSTRACT

A water purifying and desalination system includes solar concentrators that receive a sunlight and direct the sunlight toward many locations. Heat collection elements positioned at the of locations absorb and convert a solar radiation into thermal energy. Some of heat collection elements include perforations to facilitate a state change in a heat-transfer fluid having a high salinity. A condenser condenses a portion of the heat-transfer fluid using a portion of the heat-transfer fluid as its coolant.

13 Claims, 7 Drawing Sheets
(2 of 7 Drawing Sheet(s) Filed in Color)

(56) References Cited

U.S. PATENT DOCUMENTS

| | | | | |
|---|---|---|---|---|
| 2012/0112473 A1* | 5/2012 | Glynn | ............... | B01D 1/0035 |
| | | | | 290/1 R |
| 2013/0277199 A1* | 10/2013 | Summers | ............ | B01D 61/364 |
| | | | | 202/234 |
| 2015/0344325 A1* | 12/2015 | Broeckelmann | .......... | C02F 1/14 |
| | | | | 203/86 |
| 2016/0368784 A1* | 12/2016 | Haynes | ................. | C02F 1/042 |
| 2018/0079658 A1 | 3/2018 | Gershon et al. | | |

* cited by examiner

WATER DESALINIZATION SYSTEMS

PRIORITY CLAIM

This application claims priority to U.S. Provisional Patent Application Ser. Nos. 62/746,856 and 62/781,125 that are titled Water Desalinization System and Method and filed on Oct. 17, 2018 and on Dec. 18, 2018, respectively, which are herein incorporated by reference.

BACKGROUND OF THE DISCLOSURE

Technical Field

This application relates to removing salt and other impurities from seawater, and specifically to a concentrated solar powered turn-key system that produces desalinated water. The application further relates to minimizing diseases caused by ingesting contaminated water that may include biological agents such as bacteria, polio, viruses, amoeba etc. via a process that generates renewable energy. The process heats sea/ocean water and converts a portion of it into wet steam that minimizes biological contaminants.

Related Art

Despite water covering most of our planet's physical surfaces, many communities face extreme drinking water shortages. Predictions foresee many countries experiencing extreme water shortages during this century. With most of the earth's surface occupied by saltwater and other minerals, the challenge is not the availability of water, it is the accessibility of desalinated water. Some methods produce drinking water by forcing sea/ocean water through a semi-permeable membrane exclusively through which saline cannot pass. These processes (reverse osmosis) often rely on excessive amounts of petroleum, coal, and other fossil fuels to produce drinking water.

The use of fossil fuels leaves a large carbon footprint, pollutes the environment, and contributes to heart disease, stroke, lung disease, and cancer. Carbon based pollution also contributes to premature deaths, global warming, erratic weather patterns, the melting of glaciers, and the rise in sea levels.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The elements in the figures are not necessarily to scale, emphasis instead being placed upon illustrating the principles of the disclosure. Moreover, in the figures, like referenced numerals designate corresponding parts throughout the different views

DETAILED DESCRIPTION

A turn-key desalination/purification system and method (referred to as the system or the systems) exploit solar irradiation, a renewable, inexhaustible, and a non-polluting energy source to convert seawater and/or waste water (e.g., greywater) into drinking water. Through distillation and controlled pressure, some systems convert thermal energy into power, and in some applications, also store thermal energy which is used to convert seawater into drinking water and/or generate power when the sun is not shining, which allows the systems to operate continuously without consuming non-renewable energy or consuming a minimal amount of fossil fuels and other non-renewable energy. The systems' modularity provides flexibility that allows the systems to serve diverse geographic areas, meet consumption demands, and replenish energy and drinking water reserves with minimal impact on the environment.

Figure 1:
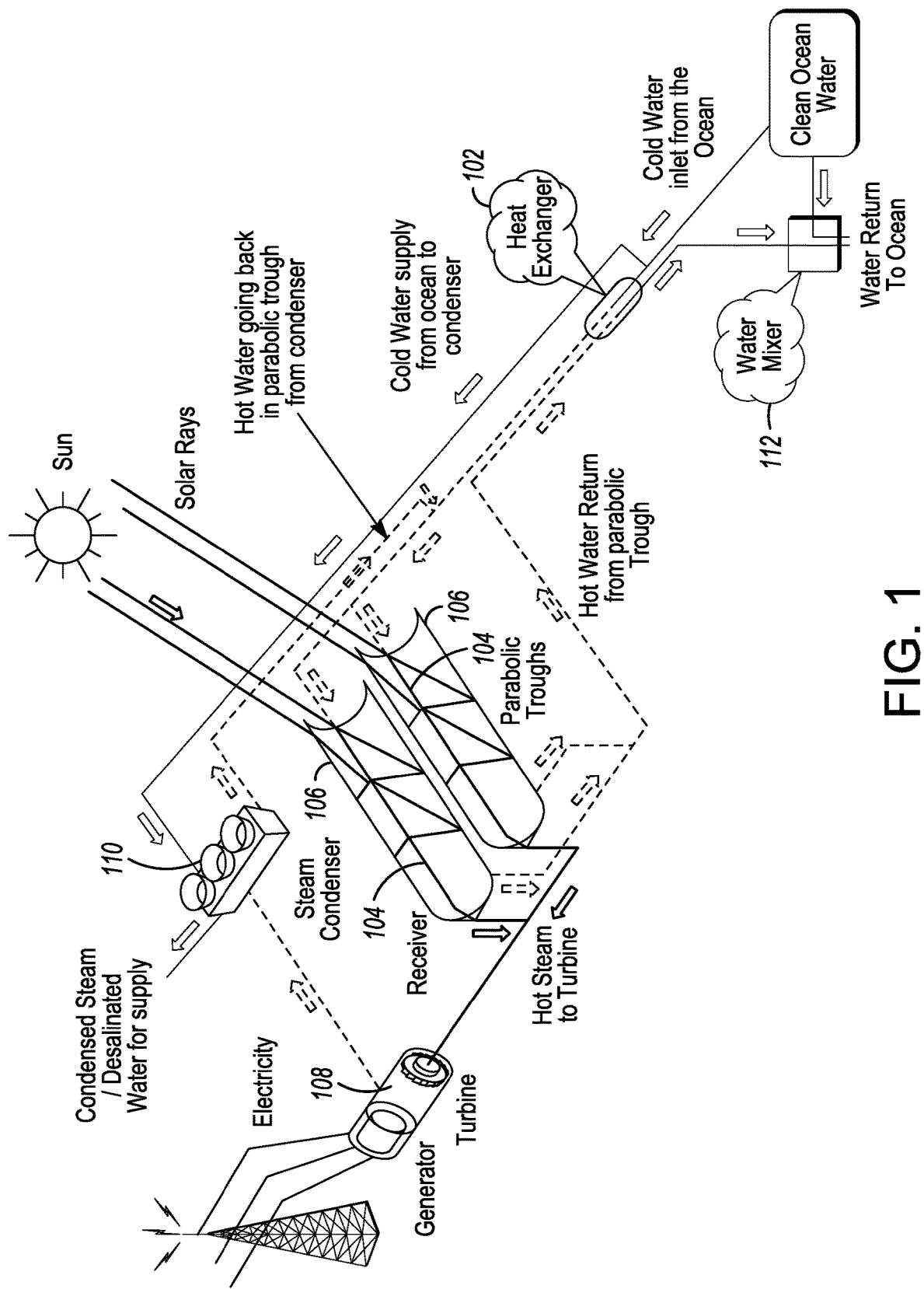
FIG. 1 is water desalination/purification system.
Figure 2:
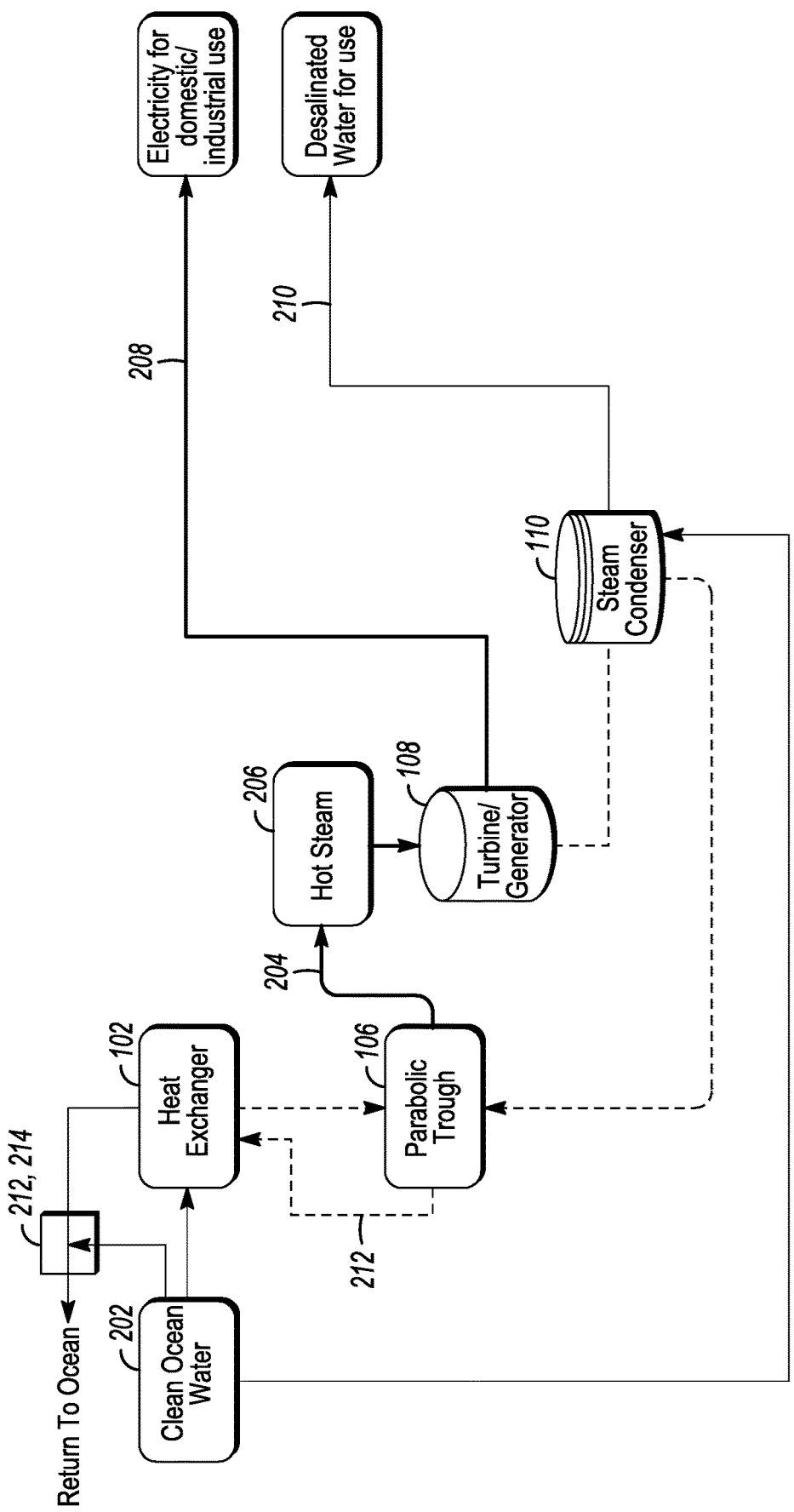
FIG. 2 is a water desalination/purification process.

In FIG. 1 or 2, the systems receive a heat transfer fluid such as water pumped from or received from the sea or ocean (referred to as seawater or oceanwater interchangeably). The sea/ocean water is preconditioned at 202 which removes large suspended debris, contaminants and particles by passing the sea/ocean water through a porous material to separate the fluid from the suspended particulate matter but not the salt or dissolved chemicals (i.e., the solute). This is referred to as clean and/or preconditioned sea/ocean water at 202. On average, the salinity of the seawater may comprise approximately three-point five percent or thirty-five parts of salt per thousand gallons of water.

The turn-key renewable systems reflect and concentrate sunlight onto heat collection elements 104 that collect solar energy and convert sunlight into thermal energy. One or more solar concentrators 106 made up of one or more reflecting materials or reflectors, reflect sunlight (e.g., the solar radiation) onto the heat collection elements 104. The solar concentrators 106 distribute the heat across a heat transfer fluid (preconditioned sea/ocean water) flowing through the heat collection elements 104. In FIG. 1, a solar field is made up of curved mirrors in the shape of two or more parabolic troughs or alternately, a plurality of linear Fresnel collectors that approximate a plurality of parabolic troughs. In other systems, other sources are used.

The solar concentrators 106 focus sunlight by bending rays of light onto the heat collection elements 104, which absorb and release heat into a heat transfer fluid (preconditioned sea/ocean water) flowing through the heat collection elements 104. In some applications, the heat transfer fluid is confined below atmospheric pressure (roughly 14.6959 pounds per square inch) by the heat collection elements 104, which lowers the heat transfer fluid's boiling point and freezing point.

Translucent and/or opaque seals (e.g., made of glass and/or metal) maintain desired pressure levels and compensate for thermal expansions and contractions. During a first phase of a renewable water cycle, the heat transfer fluid (preconditioned sea/ocean water) flowing through the heat collection elements 104 is heated with the solar radiation after being reflected from the solar concentrators 106 onto the heat collection elements 104. With a rise in temperature of the heat transfer fluid (preconditioned sea/ocean water), part of the preconditioned sea/ocean water starts converting into steam. Being lighter, the steam rises up into the upper chamber(s) 306/402 (shown in FIG. 4) through the perforations in the septa/partitions 310/404 dividing the heat transfer elements 302. The steam is channelled separately 206 to a superheated state at a pressure that minimizes water induction on steam turbines and/or electric generators 108 that produce electricity and/or electric power. Thereafter, the superheated steam is condensed into purified drinking water via a second phase of the renewable water cycle via a condensing fluid. The preconditioned sea/ocean water that is not converted into steam 212 is returned to the heat exchanger 102.

The system's flexibility facilitates the desalination of water and generation of electricity when the sun is not shining by using other heat transfer fluids, such as molten salt or oils that act as coolants instead of the preconditioned sea/ocean water, and storing other heat transfer fluids so heated in the process of cooling the steam into hot salt/oil storage tanks (described below). In some systems, the thermal energy stored in the hot salt/oil tanks is used to heat the preconditioned sea/ocean water when the sun is not shining thereby allowing the generation of desalinated/purified drinking water and power when solar energy is not available.

In FIG. 1, the superheated steam and the condensing fluid originate from the same source. In an exemplary use case, the superheated steam and condensing fluid comprise saline water or preconditioned sea/ocean water converted into different physical states. The system executes the process flows and characteristics described herein and those shown in the FIGS. to generate mechanical power, electric power and/or desalinated water and/or purify contaminated water.

The preconditioned sea/ocean water is heated through a heat exchanger 102 that transfers heat from the residual water returned from outputs of heat collection elements 104 to the preconditioned sea/ocean water. In a first pass, filtered ocean water is not heated through the heat exchanger 102 since the temperature of the heat transfer fluid (e.g., water passing through the solar concentrators 106) is substantially equal to the temperature of the incoming preconditioned sea/ocean water. After passing through the heat collection elements 104/solar concentrators 106, the heat transfer fluid (preconditioned sea/ocean water) is heated and then, when the heated water returns from the heat collection elements 104, the heated water is used to heat the incoming preconditioned sea/ocean water 102. As later explained, the preconditioned sea/ocean water returning from the heat collection elements 104 (e.g., the heat transfer fluid) having a higher concentration of salt is mixed with unconditioned seawater in a water mixer 112. It is mixed in a proportion of three to one or other appropriate ratios before returning to the ocean so that the salt content of water returned to the ocean is not very highly concentrated and harmful to marine life.

At 204, the solar concentrators 106 (shown as parabolic troughs) convert radiant energy of the sun into thermal energy. The heat transfer occurs by reflecting the received solar radiation emitted by the sun onto the heat collection elements 104 that run the length of the solar concentrators 106. In FIGS. 1 and 2, the heat collection elements 104 are positioned in a channel located at the focal length of parabolic troughs/the solar concentrators 106. The solar concentrators 106 are oriented in a north-south direction relative to the sun and track the sun's movement via a tracking system aligned to the vernal and autumnal equinoxes (March 21 and September 21), to maintain the solar concentrator's 106 position perpendicular to the sun. The alignment ensures that continuous solar radiation remains focused on the heat collection elements 104 during a solar day. In some systems, the solar concentrators 106 focus solar radiation at about thirty to one-hundred times the sun's normal thermal intensity. Seasonal/tracking compensation is not applied in some systems including those system in which sun light is received on at least a portion of a reflective surface of the solar concentrators 106. In other systems, seasonal/tracking compensation is applied to ensure that sun light is received on at least a portion of the reflective surfaces of the solar concentrators 106.

The heat collected by the solar concentrators 106 induce a physical state change in the heat transfer fluid (preconditioned sea/ocean water) held in the heat collection elements 104, which converts a portion of the heat transfer fluid (preconditioned sea/ocean water), into steam. In some systems, the physical state change occurs under a constant pressure. At optional 206, the steam separated from the residual water is heated in a portion of the heat collection elements 104 or ancillary equipment to generate superheated dry steam. Superheated dry steam can lose some internal energy (e.g., cool) during its flow to the turbine 108 and/or generator without condensing into a saturated vapor and/or liquid and causing water induction.

In FIGS. 1 and 2, the superheated dry steam generates a kinetic reaction through a mechanical expansion against the turbine blades (e.g., a turbine) 108 and/or reciprocating pistons (e.g., a generator) which causes rotors and/or pistons to turn, which render power at 208. When pressure inductions are applied, the superheated steam remains as a compressible gas as it passes through the turbine 108 or engine/generator, preventing water damage that may occur with water induction. The optional superheating at 206 improves thermal efficiency. In turbines 108 and generators, water induction damage causes thrust bearing failures, damaged blades, thermal cracking, rub damage, permanent warping, ring damage, and control damage that the disclosed technology prevents, and in other applications, greatly minimizes.

At 210 the steam and/or superheated steam is cooled to a saturation temperature by the condenser 110 that renders a desalinated water. As the superheated steam cools, it gives up heat before it condenses and releases latent heat (the enthalpy of evaporation). The heat given up by the superheated steam as it cools to saturation levels is absorbed by the heat transfer fluid. In some systems, the condensing fluid or coolant used by the condenser 110 comprises an unheated sea/ocean water preconditioned at 202. In some systems other heat exchange medium, such as molten salt or oils, is used and the thermal energy absorbed is stored in a cascaded latent energy storage system described below. The coolant medium used does not come into direct contact with the steam being cooled to render desalinated water.

To minimize the presence of volatile organic compounds that have boiling points below that of purified water, some heat collection elements 104 vent or separately collect organic compounds by evacuating the gasses they become when the heat transfer fluid is heated below the boiling point of purified water. The venting or capture of these gases in a remote system or an expansion tank before purified water vapor is retained removes or reduces the impurities found in known distillation water processes. This process control allows the disclosed systems to remove pesticides, herbicides, carcinogens, and/or other volatile chemicals that have boiling points below purified water's boiling point. The resultant purified water has a significantly higher purity than known distilled purified water. Purified water is water in which the impurity load of dissolved solids or impurities does not exceed about ten parts-per-million.

Similarly, the temperature is regulated in the heat collection elements 104 to ensure that other contaminants and/or impurities with boiling points above the boiling point of purified water are not converted into a gaseous state. In some systems, temperature control is maintained by regulating the thermal energy (e.g., blocking sunlight, re-directing sunlight via repositioning of the solar concentrators 106, etc.) directed to the heat collection elements 104, venting heat and/or media from the heat collection elements 104 when a temperature threshold is met or exceeded, and/or adding predetermined volumes of cooler heat transfer fluid to the heat collection elements 104 until a predefined temperature is met or a temperature range is maintained.

At 212, heated residual water returned from the output of heat collection elements 104 is fed through the heat exchanger 102 that transfers heat from the residual fluid returned from the output of heat collection elements 104 to the heat transfer fluid (preconditioned sea/ocean water) that feeds the input of the heat collection elements 104. The heat exchange occurs without bringing the unprocessed and processed fluids into direct contact with each other. As shown in FIG. 1, the heated condensing fluid (preconditioned sea/ocean water) flowing from the condenser 110 is mixed with the heat transfer fluid (preconditioned sea/ocean water) that feeds the input of the heat collection elements 104.

To regulate the output of the heated residual water (e.g., the temperature, composition, salinity, contaminants, etc.) before releasing it back into the sea/ocean, it is diluted in a mixing chamber 112/214. When the heat transfer fluid is preconditioned sea/ocean water, the residual seawater is generally denser and heavier before dilution and would sink below the less saline seawater if returned to the ocean undiluted. Its release would affect ocean currents and marine life if left unprocessed. In FIGS. 1 and 2, the residual water is diluted via the mixing chamber 112, until the salinity of the output of the system on average is substantially three-point five percent (~+/−4%). Thereafter, it may be diluted to attain other desired metrics such as a temperature range and a salinity level, for example. In some exemplary use cases, the mixing chamber 112 dilutes the residual water by approximately two and one-half to three times the volume of the residual water returned from the heat collection elements 104 to attain a desired temperature and salinity level. In FIG. 1, the diluent is provided by the source of the heat transfer fluid (preconditioned sea/ocean water) that feeds the heat collection elements 104.

Figure 3:
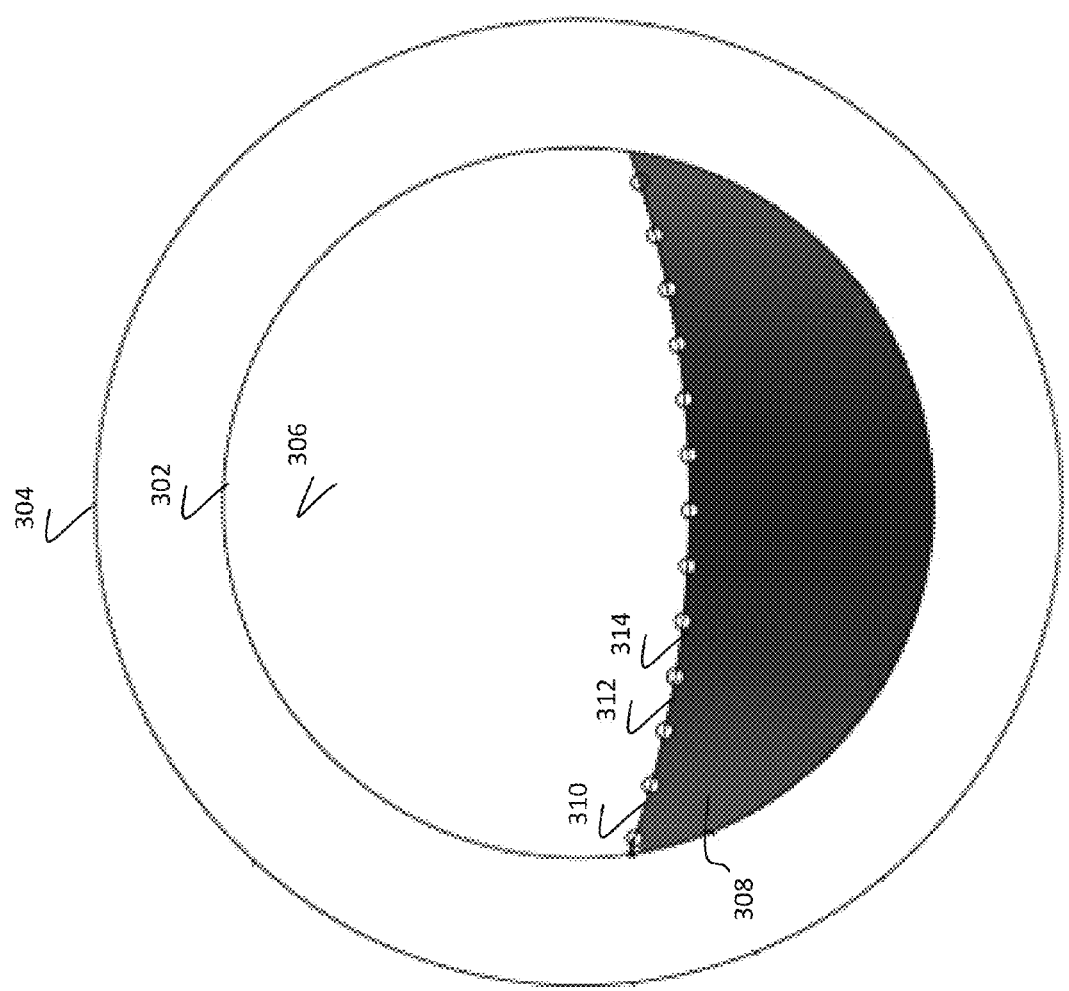
FIG. 3 is a cross-sectional view of heat collection elements.
Figure 4:
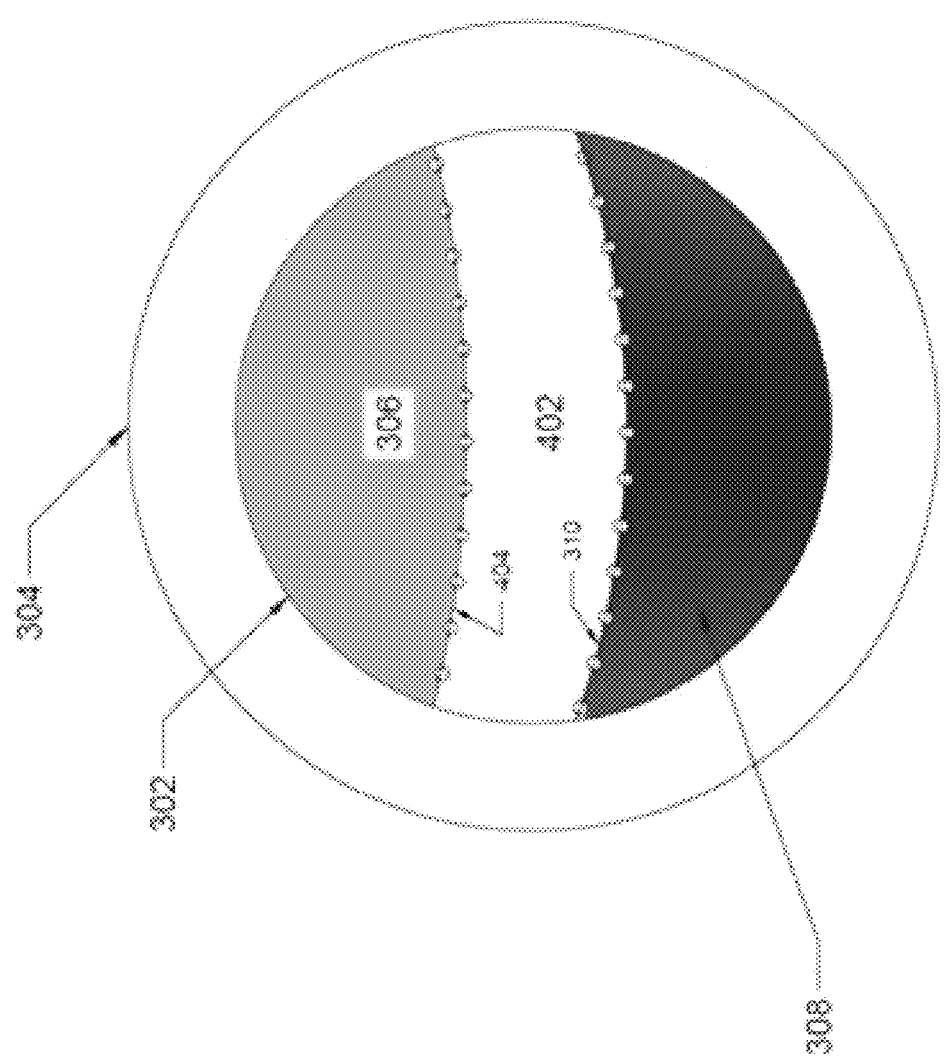
FIG. 4 is a cross-sectional view of an alternate heat collection elements.

The heat collection elements 104 comprise a superheater tube 302 and a heat collector tube 304 that is co-axial with and surrounds the superheater tube 302. In FIGS. 3 and 4, the heat collector tube 304 is made of an antireflective glass with a selective absorber surface which provides predetermined optical and radiative properties. The surface and thickness are selected to absorb radiation at wavelengths below three one-millionth of a meter, effectively capturing about nine-eight percent of the energy transmitted by solar radiation. In some systems, the heat collector tube 304 encloses and maintains a vacuum that reduces heat losses and protects against oxidation of the superheater tube 302. Some heat collection elements 104 described herein use glass and metal seals and metal bellows to control the thermal expansion between the tubing 302 and 304. The metal bellows are elastic vessels that are compressed or extended in some conditions when pressure is generated and applied.

In some systems, superheater tube 302 and the heat collector tube 304 that comprise the heat collection elements 104 have different radiative properties. In some systems, the surfaces of the tubes 302 and 304 have selective absorbent ranges. Some superheater tubes 302 have predefined radiative properties that enhance the conversion of the heat transfer fluid (preconditioned sea/ocean water) to vapor and superheated steam and the heat collector tube 304 reduces heat losses at high operating temperatures in comparison to the superheater tube 302. The surfaces may combine a high solar absorption rate and a low temperature loss rate, controlling the temperature range in which the surfaces receive and maintain predetermined thermal radiation levels. In some systems, some or all surface properties of the heat collection elements 104 are conditioned to absorb radiation at wavelengths below about three one-millionth of a meter (e.g., ~3 µm), effectively capturing about nine-eight percent of the energy transmitted by solar radiation. In some systems, some or all surface properties of the heat collection elements 104 are conditioned to absorb wavelengths of visible light and infra-red light that provide heating properties that are outside of the disclosed spectrum.

In FIGS. 3 and 4, the superheater tube 302 that directly receives the pre-conditioned heat-transfer fluid (e.g., the preconditioned seawater) includes a first and second parabolic chamber separated by a shared perforated concave barrier 310, which provides a direct sieve connection between the U-shaped chambers 306 and 308. As shown, the curvature of the perforated concave barrier 310 (e.g., the curvature of the meniscus) can induce a latitudinal vertex in the upside-down parabolic chamber or Quonset-like chamber (e.g., the second chamber 306), which causes water droplets to converge and fall toward a portion of the concave parabolic chamber or crescent chamber (e.g., the first chamber 308).

In operation, the solar energy reflected by the solar concentrators 106 is absorbed by the heat collector tube 304 and transferred to the superheater tube 302. As the energy exceeds the boiling point of the heat transfer fluid, preconditioned sea/ocean water in this exemplary use case, wet steam and suspended water droplets are generated from the sea/ocean water. Since the water droplets have a greater mass and a greater inertia than the steam, the larger cross-sectional areas of non-perforated portions of the perforated concave barrier 310 in comparison to the apertures passing through it, causes the water droplets to collect on the non-perforated portions of the perforated concave barrier 310 and remain within the first chamber 308. The water droplets and steam that pass through the perforated opening in concave barrier 310 are subject to a flow turbulence induced by the curvature of the perforated concave barrier 310. The turbulence causes the greater mass and inertia of the water droplets that passed through the perforated openings in the concave barrier 310 to collect on portions of the common perforated concave barrier 310 that lies above a cooler portion of the heat transfer fluid. This helps in separating the liquid state of the heat transfer fluid (preconditioned sea/ocean water) from the vapor/steam state of the heat transfer fluid (preconditioned sea/ocean water). The differences in temperature is shown by the grey scaled or colored portions of the heat transfer fluid that is restricted to the first chamber shown in cross-section (e.g., red or portion 310 signifies the hottest temperature, the blue or portion 314 the coldest temperature, and the purple or portion 312 represents an intermediate temperature of the heat transfer fluid between the hottest and coldest temperatures of the heat transfer fluid).

As shown, the cross-sectional area of the second chamber 306 is greater than the cross-sectional area of the first chamber 308. The greater the cross-sectional flow area of the second chamber 306 and the smaller the size of the first chamber 308 also results in a greater reduction in speed of the suspended media in the second chamber 308. This reduces the kinetic energy of the suspended water droplets in the second chamber 308 causing more water droplets to fall out of suspension than alternate sized chambers creating a great volume of superheated steam.

In another alternate system, the superheater tube 302 may include optional flow restrictors (not shown) that reduces turbulent flow of the heat transfer fluid (e.g., the preconditioned sea/ocean water) and store heat in the first chamber 308 as heat is transferred to the superheater tube 302. The flow restrictors may be integrated with or a unitary part of the superheater tube 302 and maintain a more controllable steady state temperature range in portions of the first chamber 308 by increasing the heating and cooling surface areas in first chamber 308.

FIG. 4 shows another alternate system that executes the systems functions and process flows described herein and illustrated in the FIGS. FIG. 4 further includes a chamber 402 (shown in diametral cross-section) separating the first chamber 308 from the second chamber 306 by perforated concave barriers 310 and 404, respectively. As shown, the curvature of the perforated concave barrier 310 (e.g., the curvature of the meniscus) and concave barrier 404 induces a latitudinal vertex in the vapor flow in the chamber 402 (e.g., the third chamber 306) to the respective vertexes of concave barriers 310 and 404. In some systems, the vertices are substantially aligned along a virtual longitudinal axis to establish directional flow.

In operation, the solar energy reflected by the solar concentrators 106 is absorbed by the heat collector tube 304 and transferred to the superheater tube 302 through a thermal radiation. As the energy warms the heat transfer fluid (e.g., contaminated water) above the boiling point of volatile organic compounds but below the boiling point of purified water, contaminant vapor and suspended contaminated droplets are produced. With the temperature maintained, the organic compounds are removed from the heat transfer fluid and evacuated by venting the contaminants and vapor to an ancillary remote system or tank (not shown). The venting and capture of these gases in an ancillary system or tank before purified water vapor is produced, reduces the impurities that would other remain in heat transfer fluid.

As the energy warms the heat transfer fluid above the boiling point of purified water (e.g., the purified water within the seawater in this exemplary use case), wet steam and suspended water droplets are generated. Since the water droplets have a greater mass and a greater inertia than the vapor, the larger cross-sectional areas of the perforated concave barriers 310, in comparison to the apertures passing there through, causes the water droplets to collect on the non-perforated portions of the perforated concave barrier 310 and pass through the opening to the first chamber 308. The water droplets and steam that pass through the perforated openings of the concave barrier 310 into the third chamber 402 are subject to a flow turbulence induced by the curvature of concave and convex surface barriers 310 and 404, respectively. The turbulence causes the greater mass and inertia of the water droplets that passed through the perforated concave barrier 310 into the third chamber 402 to fall back to the first chamber 308 through the openings. When the superheated steam within the chamber 402 is condensed (via later processes described herein), the distilled water is substantially free of pesticides, herbicides, carcinogens, and/or other volatile chemicals that have boiling points below purified water's boiling point. The resultant purified water has a significantly higher purity than known distilled water.

Figure 5:
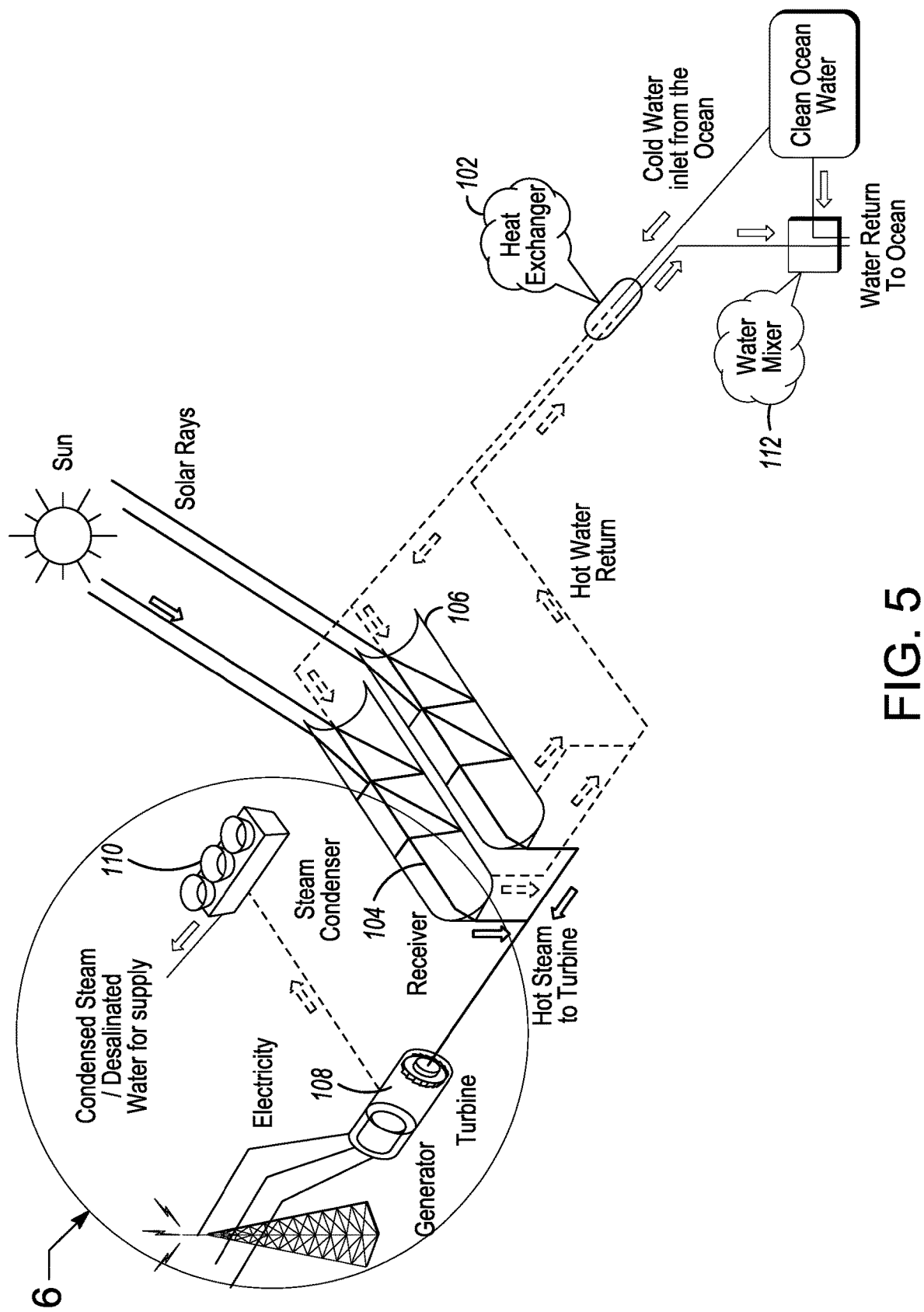
FIG. 5 is a portion of a water desalination/purification system.
Figure 6:
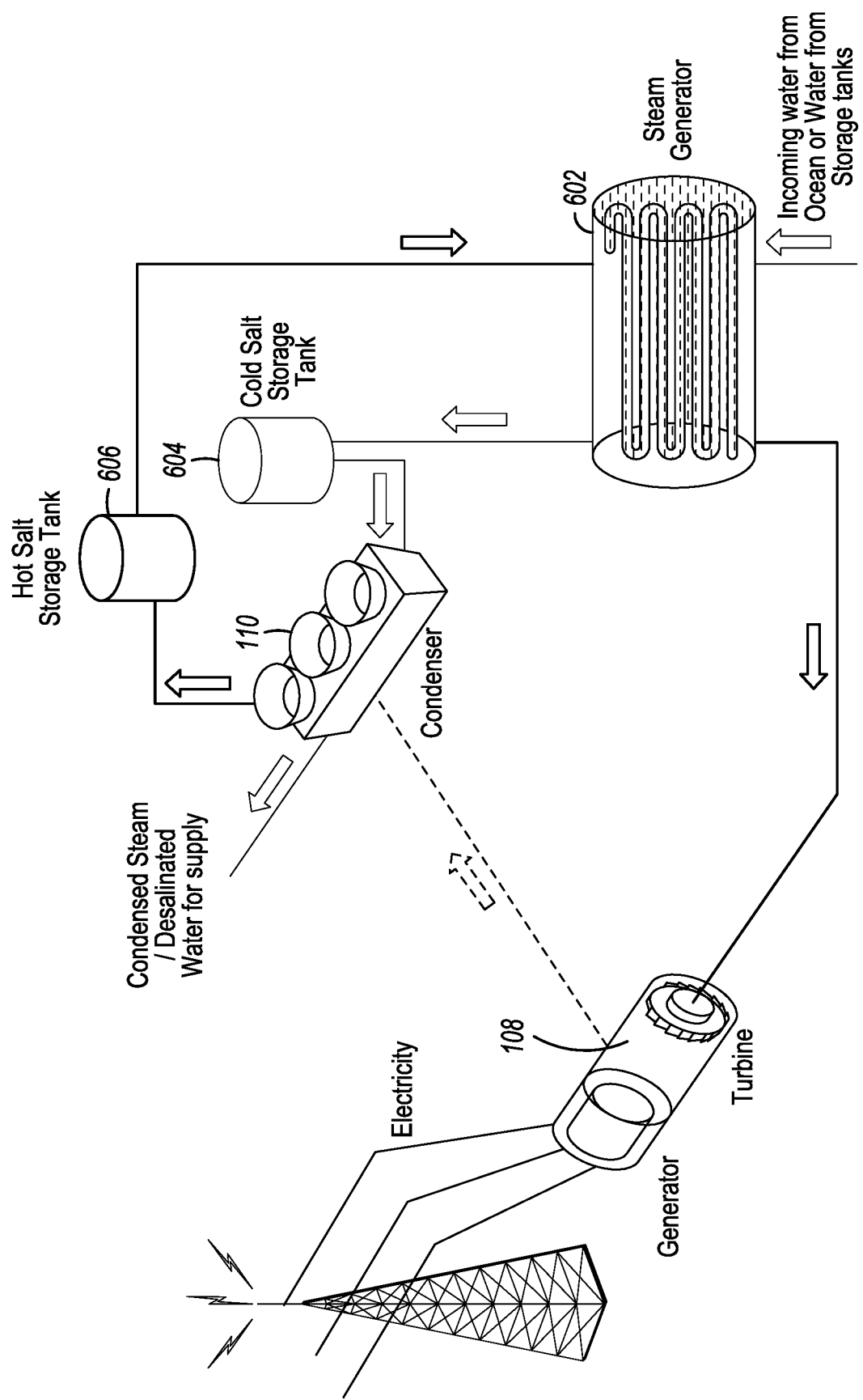
FIG. 6 is the water desalination/purification system of FIG. 5 including a steam generator.

FIGS. 5 and 6 show an alternate water desalination system that executes the systems functions and process flows described herein and illustrated in the FIGS. In FIGS. 5 and 6 the cascaded latent energy storage system provides additional energy on demand and/or dispatches energy in response to a controller request. The reserve energy can provide thermal power needed to directly generate steam via a steam generator 602, can be used to increase the turn-key desalination system's output by providing more steam and/or power, and/or make the system continuously operational (e.g., twenty-four hours a day, seven days a week). The cascaded latent energy storage system comprises a plurality of tanks 604 and 606 in which a heat exchange media such as molten salt or oil in a cold storage tank 604 is used as a refrigerant in the condenser 110. As the condenser 110 cools the steam or superheated steam, the heat exchange media (e.g., molten salt or oil) absorbs the heat given off by the steam or superheated steam, which is then stored in a hot storage tank 606. When needed, the heat exchange media flows through the steam generator 602, where heat is transferred to the heat transfer fluid (e.g., preconditioned sea/ocean water) flowing through the steam generator 602 to generate superheated steam directly. The heat exchange media that flows through the steam generator 602 then flows back to the cold storage tank 604. It is then re-heated by the steam and/or superheated steam generated during the day when sun is shining and solar radiation is used to heat the heat transfer fluid (preconditioned sea/ocean water) passing through heat collection elements 104 when it passes through the condenser 110 before it returns (via a pump in some systems) to the hot storage tank 606. In this alternate system, the heat transfer fluid (molten salt or oil) is used to create superheated steam, purified water, electricity, and/or backup power collectively or in separate systems. When there is an insufficient amount of solar power to drive the system such as during the night or during cloudy days, the cascaded latent energy storage system serves as a primary source of power.

Figure 7:
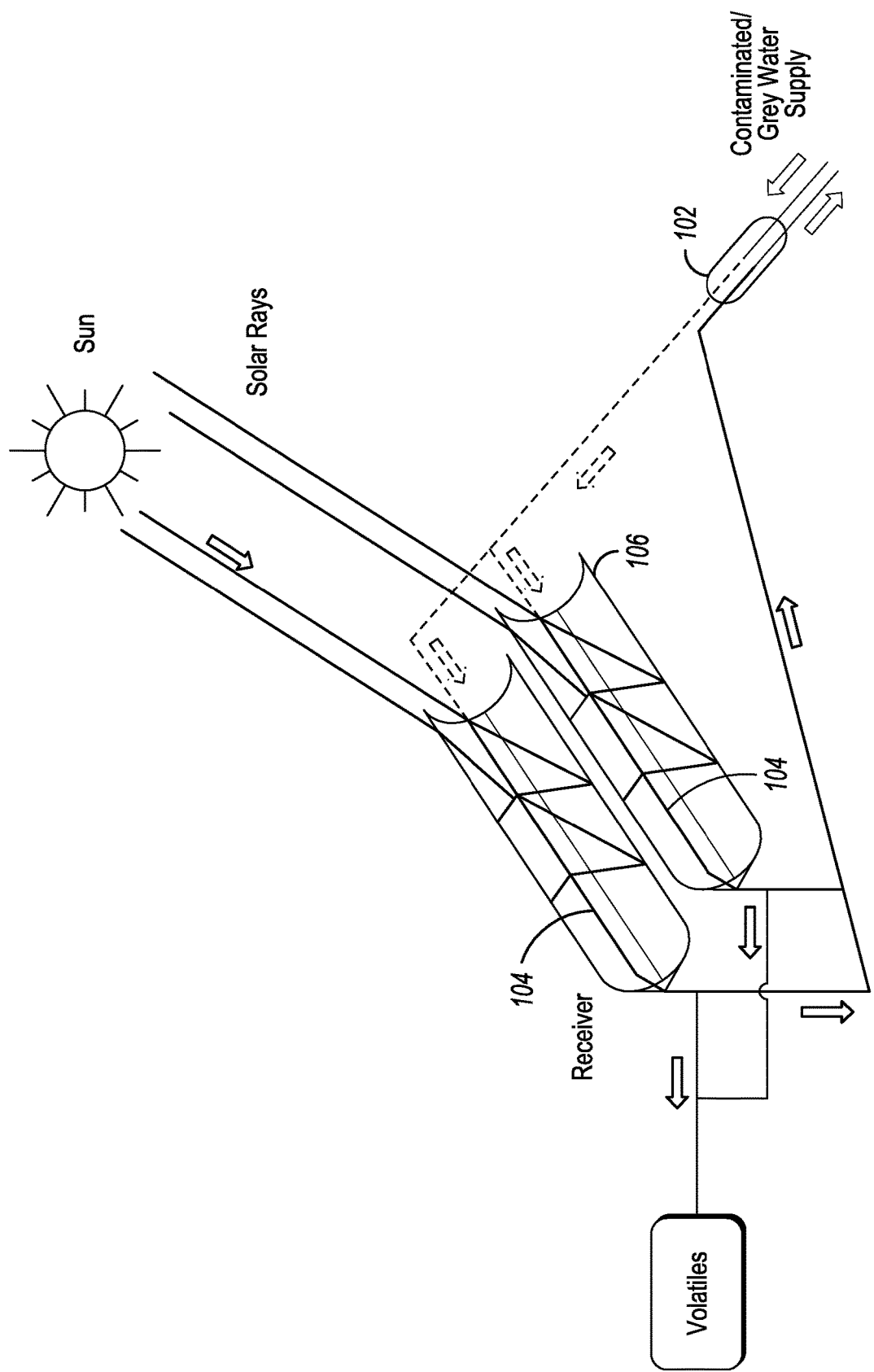
FIG. 7 is a purification system.

In some systems, the heat collection elements 104 are used to purify greywater. Greywater is domestic wastewater that has less organic loading than sewage (e.g., blackwater). After removing the suspended impurities, the greywater is passed through the heat collection elements 104 and by heating the greywater to a desired boiling point, the greywater is treated to a high standard before it is returned as purified water. The returned purified water reduces the need for other purified water sources and can significantly reduce demands on public water supplies. Further the diversion of the water through the purification system shown in FIG. 7 reduces the amount of wastewater entering sewers, which further reduces the energy demands to provide it and return it as wastewater, and the resources required to treat the wastewater. Further, the purification system can be used locally on site of the source of the greywater, reducing the resources required to produce and deliver purified water.

In operation, the solar energy reflected by the solar concentrators 106 is absorbed by the heat collector tube 304 and transferred to the superheater tube 302 through a thermal radiation. As the energy warms the greywater above the boiling point of water in the heat collection elements 104, the thermal energy in the boiling water and wet steam kills or inactivates biologically active organisms such as viruses, bacteria, protozoa, worm eggs—helminthiasis, fungi and other pathogens within the greywater. In some systems, organic compounds are also removed from the greywater and evacuated into an ancillary system and/or tank as described herein. The venting and capture of these gases before purified water vapor is produced, further reduces the impurities that would otherwise remain. Once purified, the treated water can be put to a portable or a non-portable use, filtered, etc.

Each of the disclosed systems is regulated and managed by a concentrated solar power controller system (e.g., a controller) that provides real-time control and monitoring of the fluid flows and processing described herein. Some controller systems work with controller-actuators that provide a full-range of flow control that are used with thermostats and pressure sensors.

While each of the systems and methods shown and described herein operate automatically and operate independently, they also may be encompassed within other systems and methods and execute any number (N) of iterations of some or all of the processes used generate and/or store power and/or purified water, and/or desalinated water via a turn-key system. Alternate systems may include any combination of structures and functions described or shown in one or more of the FIGS. including systems that generate purified water exclusively and systems that generate power exclusively through multiple tubing. Further, the systems illustratively disclosed herein may be practiced in the absence of any element which is disclosed (e.g., the turbine 108, the condenser 110, and/or one or more of the heat exchangers 102, filters, etc.) and may be practiced in the absence (e.g., the exclusion) of any element that is not specifically disclosed herein including those elements disclosed in the prior art but not specifically disclosed herein. The functions, acts or tasks illustrated in the FIGS. and/or described herein may be executed in response to one or more sets of logic or instructions stored in or on non-transitory computer readable media executed by the controller. The functions, acts, or tasks are independent of the software instructions, instruction sets, storage media, processor or processing strategy, and may be performed by software, hardware, integrated circuits, firmware, micro code and the like, operating alone or in combination.

The term "coupled," disclosed in this description is intended to encompass both direct and indirect coupling. Thus, a first and a second element are said to be coupled when they are directly connected with one another, as well as when the first element is connected through an intermediate component, which is connected directly or via one or more additional intermediate components to a second element. The term "substantially" or "about" encompasses a range that is largely, but not necessarily wholly, what is specified. It encompasses all but an insignificant amount, such as the values disclosed and/or a variance within a range of five to ten percent of the given value or range. The term "dry steam" and "superheated steam" is a steam that is at its temperature of saturation, but does not contain water particles in suspension. Dry steam and superheated steam have a very high dryness fraction, with substantially no moisture. In this disclosure, dry steam and superheated steam contain no more than about one half of one percent moisture. When devices or flows are responsive to commands events, and/or requests, the actions and/or steps of the devices or other flows, such as the operations that devices are performing, necessarily occur as a direct or an indirect result of the preceding commands, events, actions and/or flows. In other words, the operations and/or flows occur as a result of the preceding operations and/or flows. A device that is responsive to another requires more than an action (i.e., the device's response to) merely follow another action.

The disclosed turn-key desalination/purification system exploits renewable, inexhaustible, and a non-polluting energy source to convert seawater and waste water into purified drinking water. Through a unique process, the systems generate, and in some applications, store power, which allows the systems to operate continuously without importing energy. The systems serve diverse and rugged geographic areas, meet energy and drinking water standards and consumption demands, and replenish energy and drinking water reserves with minimal impact on the environment.

The subject-matter of the disclosure may also relate, among others, to the following aspects (referenced by numbers):

1. A purifying water system comprising:
   a plurality of solar concentrators that receive a sunlight and direct the sunlight toward a plurality of locations by bending a plurality of rays of the sunlight and focusing the plurality of rays of the sunlight onto a plurality of locations;
   a plurality of heat collection elements positioned at the plurality of locations having an outer surface conditioned to absorb and convert a solar radiation at a plurality of wavelengths below three one-millionth of a meter to a thermal energy;
   the heat collection elements are positioned to induce a state change in a heat-transfer fluid having a salinity of about three and one-half percent; and
   a condenser that condenses a portion of the heat-transfer fluid from a gaseous state to a liquid state using a portion of the heat-transfer fluid as a coolant; and
   where the plurality of heat collection elements is partially enclosed by the plurality of solar concentrators; and
   where at least one of the heat collection elements include a chamber having plurality of perforations that facilitate a transfer of a dry steam to the condenser.

2. The system of aspect of 1 where the plurality of solar concentrators comprises a plurality of parabolic troughs.

3. The system of any aspects of 1 to 2 where the plurality of solar concentrators comprises a plurality of Fresnel collectors.

4. The system of any aspects of 1 to 3 where the heat collection elements comprise a plurality of chambers in a sieve communication with one another.

5. The system of aspect 4 where the plurality chambers enclose a plurality of different volumes.

6. The system of aspect 5 where the heat collection elements comprise a first tube that has radiative properties that enhance a conversion of the heat transfer fluid to a vapor and a second tube having radiative properties that enhance the conversion of the vapor to a superheated steam.

7. The system of aspect 6 where the second tube is configured to directly enclose the heat-transfer fluid.

8. The system of any aspects of 1 to 7 where at least one of the heat collection elements directly encloses a vacuum with a second heat collection element.

9. The system of any aspects of 1 to 8 further comprising a conditioning device that transfers heat from the heat-transfer fluid that flowed through at least one of the pluralities of heat collection elements to the heat-transfer fluid that had not flowed through the at least one of the pluralities of collection elements.

10. A purifying water system comprising:
    a plurality of solar concentrators that receive a sunlight and direct the sunlight toward a plurality of locations by bending a plurality of rays of the sunlight and focusing the plurality of rays of the sunlight onto a plurality of locations; and a plurality of heat collection elements positioned at the plurality of locations having an outer surface conditioned to absorb and convert a solar radiation at a plurality of wavelengths;

where the plurality of heat collection elements is partially enclosed by the plurality of solar concentrators; and where at least one of the heat collection elements include a chamber having plurality of perforations that facilitate a transfer of a steam to a condenser.

11. The purifying water system of aspect 10 where the at least one of the heat collection elements comprise a plurality of chambers.

12. A method comprising:

receive a sunlight from a plurality of solar concentrators and directing the sunlight toward a plurality of locations by bending a plurality of rays of the sunlight and focusing the plurality of rays of the sunlight onto a plurality of locations;

receiving the plurality of rays of the sunlight at a plurality of heat collection elements positioned at the plurality of locations having a physical surface conditioned to absorb and convert a solar radiation at a plurality of wavelengths below three one-millionth of a meter into a thermal energy;

inducing a state change in a heat-transfer fluid having a salinity of about three and one-half percent through the heat collection elements; and condensing a portion of the heat-transfer fluid from a gaseous state to a liquid state through a condenser by using a portion of the heat-transfer fluid as a coolant;

where the plurality of heat collection elements is partially enclosed by the plurality of solar concentrators; and where at least one of the heat collection elements include a chamber having plurality of perforations that facilitate a transfer of a dry steam to the condenser.

13. The method of aspect 12 where the plurality of solar concentrators comprises a plurality of parabolic troughs.

14. The method of any aspects of 12 to 13 where the plurality of solar concentrators comprises a plurality of Fresnel collectors.

15. The method of any aspects of 12 to 14 where the heat collection elements comprise a plurality of chambers in a sieve communication with one another.

16. The method of aspect 15 where the plurality chambers consist of three chambers.

17. The method of aspect 15 where the heat collection elements comprise a first tube having radiative properties that enhance a conversion of the heat transfer fluid to a vapor and second tube having radiative properties that enhance the conversion of the vapor to a superheated steam.

18. The method of aspect 17 where the first tube directly encloses a chamber and the second tube encloses three chambers.

19. The method of any aspects of 12 to 18 further comprising a conditioning device that transfers heat from the heat-transfer fluid that flowed through at least one of the pluralities of heat collection elements to the heat-transfer fluid that had not flowed through the at least one of the pluralities of collection elements.

20. The method of any aspects of 12 to 19 further comprising a kinetic energy of the gaseous state into an electrical power.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

The invention claimed is:

1. A purifying water system comprising:

a plurality of solar concentrators that receive a sunlight and direct the sunlight toward a plurality of locations by bending a plurality of rays of the sunlight and focusing the plurality of rays of the sunlight onto the plurality of locations;

a plurality of heat collection elements positioned at the plurality of locations having an outer surface conditioned to absorb and convert a solar radiation at a plurality of wavelengths below three one-millionth of a meter to a thermal energy;

the heat collection elements are positioned to induce a state change in a heat-transfer fluid having a salinity of about three and one-half percent; and a condenser that condenses a portion of the heat-transfer fluid from a gaseous state to a liquid state using a portion of the heat-transfer fluid as a coolant; and where the plurality of heat collection elements are partially enclosed by the plurality of solar concentrators; and where at least one of the heat collection elements include a plurality of parabolic chambers that are continuous with a length of the at least one of the heat collection elements, the plurality of parabolic chambers formed by a concave barrier adjacent to and facing a convex barrier each having plurality of perforations along the length of the at least one of the heat collection elements; the concave barrier and the convex barrier having curvatures that induce a flow turbulence through the at least one of the heat collection elements that causes a condensation that facilitate a transfer of a dry steam to the condenser.

2. The system of claim 1 where the plurality of solar concentrators comprises a plurality of parabolic troughs.

3. The system of claim 1 where the plurality of solar concentrators comprises a plurality of Fresnel collectors.

4. The system of claim 1 where the heat collection elements comprise a plurality of chambers in a sieve communication with one another.

5. The system of claim 4 where the plurality of parabolic chambers enclose a plurality of different volumes.

6. The system of claim 5 where the heat collection elements comprise a first tube that has radiative properties that enhance a conversion of the heat transfer fluid to a vapor and a second tube having radiative properties that enhance the conversion of the vapor to a superheated steam.

7. The system of claim 6 where the second tube is configured to directly enclose the heat-transfer fluid.

8. The system of claim 1 where at least one of the heat collection elements directly encloses a vacuum with a second heat collection element.

9. The system of claim 1 further comprising a conditioning device that transfers heat from the heat-transfer fluid that flowed through at least one of the pluralities of heat collection elements to the heat-transfer fluid that had not flowed through the at least one of the pluralities of collection elements.

10. The purifying water system of claim 1 where at least one of the heat collection elements comprises an antireflective material having a thickness that captures about nine-eight percent of the solar radiation.

11. A purifying water system comprising:
a plurality of solar concentrators that receive a sunlight and direct the sunlight toward a plurality of locations by bending a plurality of rays of the sunlight and focusing the plurality of rays of the sunlight onto a plurality of locations; and
a plurality of heat collection elements positioned at the plurality of locations having an outer surface conditioned to absorb and convert a solar radiation at a plurality of wavelengths;
where the plurality of heat collection elements is partially enclosed by the plurality of solar concentrators; and
where at least one of the heat collection elements include a plurality of parabolic chambers that are continuous with a length of the at least one of the heat collection elements, the plurality of parabolic chambers formed by a concave barrier adjacent to and facing a convex barrier each having plurality of perforations along the length of the at least one of the heat collection elements, the concave barrier and the convex barrier having curvatures that induce a flow turbulence through the at least one of the heat collection elements that causes a condensation that facilitate a transfer of a steam to a condenser.

12. The purifying water system of claim 11 where the at least one of the heat collection elements comprise a crescent like chamber that separated the plurality parabolic chambers.

13. The purifying water system of claim 11 where at least one of the heat collection elements comprise an antireflective material having a thickness that absorbs wavelengths below three one-millionth of a meter such that the thickness captures about nine-eight percent of the solar radiation.

* * * * *